(No Model.)
G. S. ACKLEY.
ADJUSTABLE BALE TIE.
No. 324,348. Patented Aug. 18, 1885.
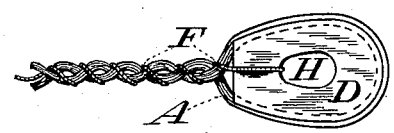
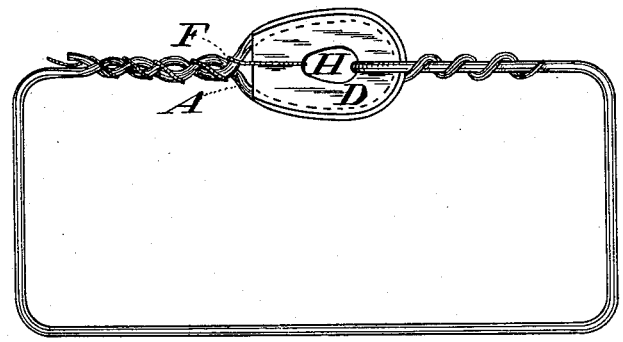
WITNESSES:
Jos. H. Blackwood.
J. Andrew Wilt
INVENTOR:
per Griffin S. Ackley
Geo. V. Myer
Attorney

UNITED STATES PATENT OFFICE.

GRIFFIN S. ACKLEY, OF TOWANDA, PENNSYLVANIA.

ADJUSTABLE BALE-TIE.

SPECIFICATION forming part of Letters Patent No. 324,348, dated August 18, 1885.

Application filed May 1, 1885. (No model.)

*To all whom it may concern:*

Be it known that I, GRIFFIN S. ACKLEY, a citizen of the United States, residing at Towanda borough, in the county of Bradford and State of Pennsylvania, have invented certain new and useful Improvements in Adjustable Bale-Ties; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in adjustable bale-ties; and the object of my improvement is to prevent the ties breaking in the eyes or loops, where the wire forming them is necessarily bent and suddenly subjected to great strain when the bale is released from the press. This object is attained by means of my elastic disk, preventing the sudden acute bend in the wire at the point where the loops formed on opposite ends of the tie connect, by keeping the loops spread in a natural curved shape, as illustrated in the accompanying drawings, in which similar letters refer to similar parts in both views.

Figure 1 shows one end of my bale-tie formed into a loop with my disk secured in the loop or eye. Fig. 2 shows both ends of the bale-tie as they appear when it is passed around the bale and connected together and ready to receive the strain caused by the expansion of the bale when it is taken from the press.

One end of the bale-wire is formed into a single loop, A, by passing it around the outer edge of the disk D and twisting it back upon itself. The disk D is provided with a hole, H, at or near its center, through which a small wire, F, is passed, with its ends twisted together with the twist of the loop A. The object of this small wire is to more securely fasten the disk D in its place within the loop, though the bale-wire, by pressing tightly around its outer edge when it is twisted to form the loop, sinks in the disk D, which is made of rubber or its equivalent, forming a groove, which of itself quite securely holds the said disk in place.

My bale-tie, as now described and shown in Fig. 1, is ready for use, and when it has been passed around the bale the opposite and free end of the tie is passed through the hole H in the disk D, and when drawn sufficiently tight to adjust it to the size of the bale, is twisted back upon itself, thus connecting the two ends together, as shown in Fig. 2. The bale is then removed from the press, when by its expansion a great strain on the bale-tie results, which often breaks the wire commonly used for this purpose. This breakage my disk prevents by holding the loops apart, so that the wire cannot bend abruptly. The disk being made of an elastic material the wire forms itself into a natural curved loop around it.

I am aware that metallic and other solid inflexible rings have been used; and, also, in order to prevent breaking of the band by the sudden strain above described, it has been usual to use wire rope, or to double the wire; but by the use of my elastic ring or disk a single strand of common wire can be employed, thus saving cost of material and labor in production.

I make my disk in a horseshoe shape, because this shape is nearly that of a natural loop, and because the wire, in being passed tightly around it in this shape, sinks in deeply at the two angular corners, thus more securely holding it in place.

Having thus fully described my invention, what I claim and desire to secure by Letters Patent, is—

1. An adjustable bale-tie, consisting of an elastic cushion provided with a central hole, in combination with a wire band passed around said elastic cushion and twisted upon itself, whereby when the free end of the band is passed around the bale and through said central hole, for the purpose of securing the same, the said band is prevented from breaking from any strain by the yielding action of the cushion, substantially as described.

2. In an adjustable bale-tie, a ring provided with a hole at or near its center and the bale-wire, in combination with a small wire passed through said hole in the ring with its ends doubled and bent back and twisted within the twist of the loop of the bale-tie, whereby the said ring is securely held in place within the loop, substantially as described.

In testimony whereof I affix my signature in presence of two witnesses.

GRIFFIN S. ACKLEY.

Witnesses:
JOHN E. FOX,
C. G. WEBB.